March 15, 1966  A. L. BASTIAN  3,241,090
DELAY LINE WITH AMBIENT TEMPERATURE COMPENSATION
Filed Oct. 30, 1961
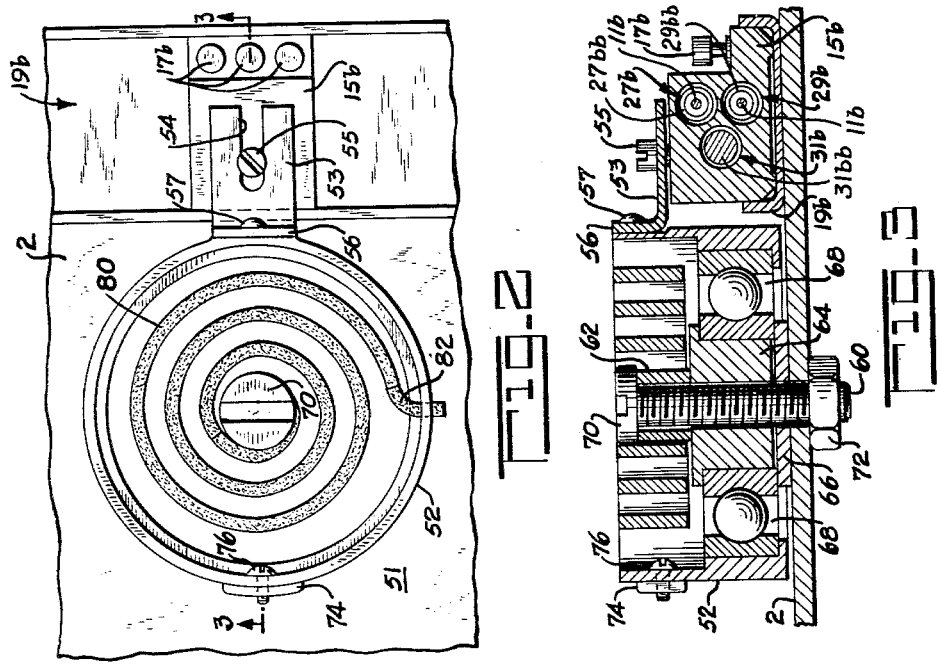
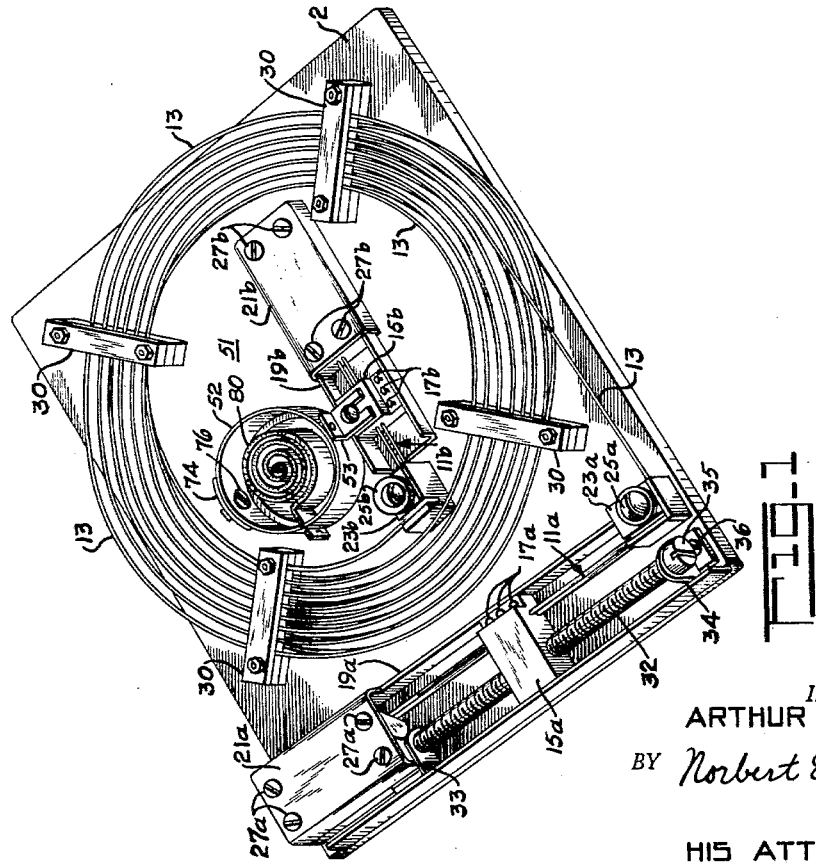
INVENTOR.
ARTHUR L. BASTIAN
BY Norbert Ederer
HIS ATTORNEY United States Patent Office 3,241,090
Patented Mar. 15, 1966

3,241,090
DELAY LINE WITH AMBIENT TEMPERATURE COMPENSATION
Arthur L. Bastian, Hackensack, N.J., assignor to Curtiss-Wright Corporation, a corporation of Delaware
Filed Oct. 30, 1961, Ser. No. 148,604
1 Claim. (Cl. 333—30)

This invention relates to delay lines of the kind used in the electronic arts, particularly in electronic computing equipment. More particularly, the present invention is directed to improved acoustic, or more accurately ultrasonic delay lines of the magnetostrictive type with ambient temperature compensation.

Magnetostrictive delay lines of the general character contemplated by the present invention are known in the art. Their constructional and operational features may be briefly and conveniently reviewed here by preliminary reference to certain portions of FIGURE 1 of the accompanying drawing, later described in more detail. The delay line per se comprises so-called magnetostrictive wire, here shown as acoustically continuous lengths 11a, 13, 11b, and a pair of terminating transducers 15a and 15b. Either transducer may serve as input to the delay line, the other as output. Arbitrarily considering transducer 15a as input transducer, an electrical pulse applied to its terminals 17a will induce a pulsed magnetic field within the transducer. The magnetic field shock-excites the delay line; that is magnetostrictive wire 11a, under the influence of the magnetic field, will experience local mechanical stresses which propagate in the magnetostrictive wire with ultrasonic velocity that is characteristic for the particular magnetostrictive material. The phenomenon is similar to sound wave propagation. When the so induced shock-wave reaches output transducer 15b, there occurs a series of events which is inverse to that at transducer 15a. A pulsed magnetic field will be set up within transducer 15b, which in turn will induce a voltage that is available at its terminals 17b for utilization in external circuitry. The delay of the line is thus equivalent to the time separation of the input and output pulses, and as such is determined by the separation of the transducers measured along the magnetostrictive wire, and the velocity characteristic for a given magnetostrictive wire material.

In many circuit applications high accuracy of the delay time is required, for example five-place accuracy. Very often this accuracy must be maintained under wide variations of temperature. The characteristic propagation velocity, and therefore the delay time is temperature sensitive. The temperature coefficient of delay is expressed in terms of parts per million per degree centigrade, abbreviated as p.p.m./° C. or hereinafter simply as p.p.m. Nickel wire can be obtained with a coefficient of 140 p.p.m. and Ni-Span C wire a coefficient as low as 15 p.p.m. A coefficient of 5 p.p.m. can be obtained by careful selection of wire, appropriate heat treatment, and cold working. This coefficient of 5 p.p.m. is not low enough to meet stringent requirements of many circuit applications, particularly in military or airborne equipment where wide ranges of environmental temperature are often encountered. For example, a representative delay period may be 2,000 microseconds (more correctly presented as 2,000.0 microseconds for five-place accuracy). Given a temperature coefficient even as low as 5 p.p.m. for a 50° C. operating range, the variation in time delay is 0.5 microsecond, which is not tolerable in many applications. Accordingly, it is a general object of the invention to provide an improved delay line.

Another object of the invention is the provision of a delay line of the described character having an effective temperature coefficient of less than 2 p.p.m. and preferably as low as a fraction of 1 p.p.m.

A further object of the invention is achievement of the aforegoing objects in a simple, economical, and reliable manner.

Briefly stated, the invention contemplates provision of temperature responsive means which varies the effective acoustical separation of the transducers in the direction and in an amount necessary for the desired compensation. In a specific embodiment of the invention, the temperature responsive means is a bi-metal member which is subject to expansion and contraction with temperature changes. The attendant movement of the bi-metal member is imparted to one of the transducer heads bodily to move it relative to the magnetostrictive wire to achieve compensation.

Other objects, advantages, and novel features of the invention will be more readily apparent from the following, more detailed specification, of which the appended claims form a part, when considered together with the accompanying drawing, in which:

FIGURE 1 is an isometric view of delay line structure in accordance with a preferred embodiment of the invention;

FIGURE 2 is an enlarged top plan view of the compensating means 51 of FIGURE 1; and, FIGURE 3 is a vertical sectional view taken along line 3—3 of FIGURE 2.

Referring more specifically to FIGURE 1, delay line structure is supported on a base member 2, which by way of example may be metallic. Secured to base member 2 (by brazing or soldering, for example) are a pair of channel members 19a and 19b in which the transducers 15a and 15b are respectively located. The transducers are constrained to translational motion, longitudinally along the respective channels. The structural configurations found at the ends of the delay line are similar in many respects. To the extent that they are similar, a single description will be given with respect to delay line end associated with transducer 15a. The corresponding members found at the other delay line end may be identified implicitly by substitution of reference character b for a, the numeral part of the reference being the same at both locations. Differences in the structure at the two delay line ends will be specifically described.

Wire length 11a is actually a pair of magnetostrictive wires which extend in the longitudinal direction of the channel from an absorber 21a through transducer 15a to a block member 23a which is slotted to accommodate the wires, and is secured to base member 2 by means of a screw 25a. The absorber 21a is secured to base member 2 by means of screws 27a, and serves to absorb and thereby prevent spurious reflections of the induced shock wave. A brief general description of the output transducer 15b will be sufficient, as this component is well known in the art. As shown in FIG. 3, for example, a body member is provided with three bores 27b, 29b and 31b disposed as indicated, for housing conventional transducer coils and magnetic biasing means. The transducer coils for the two wires 11b can conveniently be in bobbin form indicated at 27bb and 29bb for placement in the bores 27b and 29b, respectively. Each wire 11b passes centrally through its respective coil with sufficient clearance so as not to interfere with movement of the transducer unit along the wires. A bias field is suitably provided by a permanent bar magnet 31bb within the bore 31b. The magnetic coils within bores 27b and 29b have leads (not shown) brought out to terminals 17b, the center terminal serving as a common terminal.

At the delay line input, the wire pair 11a is "push-pull" excited by application of oppositely poled pulses to terminal 17a, assuming an input function for the transducer 15a. The induced opposite magnetic fields give rise to a local compressive stress in one wire 11a and a local tensile stress in the other wire 11a, and both shock waves propagate with characteristic supersonic velocity along the wire lengths, and in both directions, except that the shock wave reaching transducer 21a is absorbed. If transducer 15a acts as output transducer, the incoming "push-pull" shock waves will conversely be transformed into a pair of electrical pulses of opposite polarity, and absorber 21a will absorb any wave reaching it. The mode of propagation is longitudinal, as distinguished from the propagational mode in the single wire 13 which is a torsional or shearing mode.

The magnetostrictive wire 13 is joined (within member 23a which is slotted so as also to accept wire 13) to the wire pair 11a at right angles, with the plane of wire 13 intermediate of the planes of wires 11a. Accordingly, when the upper one of the wires 11a is subjected to a compressive stress pulse, say in direction generally toward the right as viewed in FIG. 1, the wire 13 is subjected to a twisting or torsional stress in clockwise direction; the following tensile stress pulse on the lower wire 11a likewise produces torsional stress on the wire 13 in the same, i.e., clockwise, direction. A series of clockwise shock pulses are therefore transmitted to the wire 13 by the pulses of opposite sense from wires 11a, respectively.

Assuming that transducer 15a is an input transducer, the push-pull shock wave incoming to mode converter 23a via wire pair 11a will set up a local torsional stress at wire 13, and this stress will propagate along wire 13 with characteristic ultrasonic velocity. Assuming that transducer 15a is the output transducer, the torsional mode wave front incoming to mode converter 23a will set up a pair of push-pull waves in wires 11a in longitudinal mode.

Wire 13 is coiled to multiple rings and multiple layers of rings as shown; this is entirely permissible for torsional mode propagation. It is supported by several multi-layer brackets 30, which are fastened together and to the base of member 2 by indicated nuts and bolts.

The respective means for positioning transducers 15a and 15b are of different type and will be separately described. A lead screw 32 extends in the longitudinal direction of channel 19a from a bearing bracket 33 adjacent absorber 21a, through a threaded through-hole in transducer 15a to a second bearing bracket 34 adjacent block member 23a. It is provided with a slotted head 35 at bracket 34, the bracket being fastened to the base by means of screw 36. The delay time is adjusted to the nominal value by turning head 35 with a screwdriver, thereby bodily to position the transducer 15a.

The transducer 15b, on the other hand, is positioned by the action of temperature responsive means 51, which includes a rotatable cup 52 to which is fastened a yoke member 53 for rotation in unison with cup 52. Referring also to FIGURES 2 and 3, the yoke 53 is provided with a U-shaped slot 54 in which is seated a screw 55 which is rigidly secured to the transducer 15b at its upper surface. The yoke 53 is provided with an upstanding flange member 56 which is secured to the cup 52 by screw means 57. As the cup rotates, transducer 15b is actuated to slide within channel 11b in the direction and by an amount necessary to achieve temperature compensation as will now be seen.

As may best be seen in FIGURE 3, the temperature compensating means 51 includes several stationary members, namely a through-bolt 60, a sleeve 62, a bushing 64, a washer 66, and inner races of ball bearings 68. These members are maintained in rigid and stationary relationship in the following manner. The through-bolt 60 is provided with a slotted head 70 for tightening the members together and extends through sleeve 62, bushing 64, washer 66, base member 2 and is fastened to the base member by a bolt 72. The flanges of head 70 engage and bear upon the upper end of sleeve 62, whose lower end in turn engages and bears upon bushing 64. The bushing is flanged at its upper end so as to bear upon the inner races of ball bearing 68, and at its lower end bushing in turn engages and bears upon washer 66 which is sandwiched between bushing and base member. The outer races of ball bearing 68 are free to rotate and frictionally engage the conforming interior side wall portion of cup 52. The cup walls are of somewhat reduced thicknesses upward of ball bearing 68. The yoke 53 is fastened to cup 52 towards the upper end of the cup, and diametrically opposite to the yoke there is fastened to the cup a counterweight 74 by means of indicated nut and bolt 76. The opening in counterweight 74 through which the fastening bolt passes is widened in the circumferential direction to permit accurate positioning of counterweight 74. When so accurately positioned, the counterweight renders the cup substantially insensitive to vibration, thereby minimizing undesired shifting of transducer 15b.

Rotation is imparted to cup 52 by concentrically spiraled bi-metallic member 80, whose interior end is secured to sleeve 62 and head 70 by brazing. The exterior end 82 of the bi-metal member passes through an accommodating vertical slot in cup 52. The bi-metal member 80 is coiled to the appropriate stiffness, so that at a given temperature it is unloaded, that is to say, no motion will be imparted to cup 52 at fixed temperature. On the other hand, bi-metal coil 80 is sufficiently resilient, so that at a given temperature it will restore cup 52 to the required position in the event bi-metal and cup are subjected to displacement by shock or vibration, for example. On the other hand, as the ambient temperature changes, the bi-metal, which consists of two joined-together strips having unequal temperature coefficients of expansion, will expand or contract as the case may be. In as much as its inner end is fixed, its outer end 82 will bodily rotate cup 52, and therefore impart translational motion to transducer 15b via yoke 52 so as to compensate for the change in delay due to temperature change.

The described delay line structure meets the objectives set forth in the introductory part of the specification. In a working embodiment of the described delay line, the nominal delay time was 1914.5 microseconds, and the delay was held to within ±0.1 microsecond over the temperature range from −1° C. to +52° C. Without the temperature compensator, the same line had a variation of ±0.4 microsecond over the same temperature range. The magnetostrictive wire was made of Ni-Span C, and this composition is presently preferred.

While the invention has been described by reference to one specific embodiment, it should be understood that this invention is not limited to specific details of construction and arrangement thereof herein illustrated, and that changes and modifications may occur to one skilled in the art without departing from the spirit of the invention.

What is claimed is:

A magnetostrictive delay line comprising a wire-like magnetostrictive medium serving as a signal transmission means having a given nominal delay, an electro-acoustical input transducer located at a terminus of the acoustical wire and adapted to receive an electrical input signal and to convert the same in said wire to an acoustical signal to be transmitted, an electro-acoustical output transducer located at another terminus of the acoustical wire and adapted to receive the delayed, transmitted acoustical signal and to reconvert it to an electrical signal, one of said transducers being slidable along said wire from the normal position corresponding to said nominal delay so as to vary the line delay about said nominal delay, and means responsive to ambient temperature for automatically compensating for variations in said nominal delay due to variations in said ambient temperature, said compensating means comprising a rotatable cup, stationary means serving as an axle for said cup to rotate about, a spiraled bi-metallic member disposed within said cup in a plane transverse to said stationary means and having ends which are respectively fixed to said stationary means, and engage a side wall of said cup to rotate the same as said bi-metallic member expands and contracts in response to ambient temperature variations, and means secured to said cup and engaging said slidable transducer to slide the same along said wire as said cup rotates, thereby to compensate for variations in said nominal delay due to said temperature variations.

References Cited by the Examiner

UNITED STATES PATENTS

| | | | |
|---|---|---|---|
| 1,052,816 | 2/1913 | Hodaway | 310—4.1 |
| 1,260,300 | 3/1918 | Bangerter | 60—23 |
| 2,323,738 | 7/1943 | Vassar | 310—4.1 |
| 2,337,084 | 12/1943 | Crise | 60—23 |
| 2,760,165 | 8/1956 | Sullivan | 333—30 |
| 2,837,721 | 6/1958 | Millership | 333—30 |
| 2,863,120 | 12/1958 | Powell | 333—30 |
| 2,846,968 | 7/1960 | Faulkner | 333—30 |
| 2,982,925 | 5/1961 | Barrow et al. | 333—30 |

HERMAN KARL SAALBACH, *Primary Examiner.*